United States Patent
Li et al.

(10) Patent No.: US 9,062,443 B2
(45) Date of Patent: Jun. 23, 2015

(54) WATER INTAKE STRUCTURE FOR WATER-STORING KEY FLOAT

(75) Inventors: Feiyu Li, Xiamen (CN); Dongsheng Yao, Xiamen (CN); Yuzhi Liu, Xiamen (CN)

(73) Assignee: Feiyu Li, Xiamen (CN)

( * ) Notice: Subject to any disclaimer, the term of this patent is extended or adjusted under 35 U.S.C. 154(b) by 188 days.

(21) Appl. No.: 13/884,894

(22) PCT Filed: Nov. 7, 2011

(86) PCT No.: PCT/CN2011/081846
§ 371 (c)(1),
(2), (4) Date: May 10, 2013

(87) PCT Pub. No.: WO2012/062188
PCT Pub. Date: May 18, 2012

(65) Prior Publication Data
US 2013/0227774 A1 Sep. 5, 2013

(30) Foreign Application Priority Data

Nov. 11, 2010 (CN) .......................... 2010 2 0604231

(51) Int. Cl.
| E03D 1/35 | (2006.01) |
| E03D 1/30 | (2006.01) |
| E03D 1/32 | (2006.01) |
| F16K 21/18 | (2006.01) |
| F16K 21/16 | (2006.01) |

(52) U.S. Cl.
CPC ...... *E03D 1/304* (2013.01); *E03D 1/32* (2013.01); *F16K 21/18* (2013.01); *F16K 21/165* (2013.01)

(58) Field of Classification Search
CPC .......................................................... E03D 1/34
USPC ....................................................... 4/300–442
See application file for complete search history.

(56) References Cited

U.S. PATENT DOCUMENTS

| 4,600,031 A | 7/1986 | Nestich |
| 2003/0213053 A1 | 11/2003 | Huang |

FOREIGN PATENT DOCUMENTS

| CN | 2217147 Y | 1/1996 |
| CN | 101397810 A | 4/2009 |
| CN | 201883503 U | 6/2011 |
| GB | 2421252 A | 6/2006 |

*Primary Examiner* — Lori Baker
(74) *Attorney, Agent, or Firm* — Rabin & Berdo, P.C.

(57) ABSTRACT

The present invention discloses an inlet structure of water-storing keg float, comprises an inlet, an outlet pipe and a water-storing keg float with a storage tank, and the inlet is provided with a channel passing through the outlet pipe, and the channel is provided with a water-storing cavity and a guide hole, and the guide hole is communicated with the water-storing cavity and the outside wall of the outlet pipe. Because water-storing cavity is present, part of water from the inlet can be stored in the water-storing cavity because of gravity, and this part of water fully enters the storage tank of the keg float through the guide hole, and the keg float can be balanced effectively under different water pressure conditions, and the stability of the keg float is enhanced.

13 Claims, 4 Drawing Sheets

WATER INTAKE STRUCTURE FOR WATER-STORING KEY FLOAT

FIELD OF THE INVENTION

The present invention relates to an inlet structure of water-storing keg float which is used in the field of the control valve of the keg float of the toilet.

BACKGROUND OF THE INVENTION

During the using process of the autocontrol valve of flush toilet, the control valves using the keg float have been already used widely. This kind of valves uses the response of the keg float in the water tank to the height of water level to control the break-make of the valve, so that the water yield in the water tank of the toilet can be automatically maintained. The situation commonly seen in several modified proposals of the keg float is that the keg float is provided with a water channel, and guide holes are opened at the inlet of the whole outlet pipe, so that small amount of water expelled from the outlet pipe can pass the guide holes and drops into the water channel of the keg float, and the temporary balance weight to the keg float is present, and the stability of the promotion and demotion of the keg float is achieved by decreasing the sensitivity of the keg float.

However, there are several defects in this kind of water-storing keg float proposal with water channel: when the water pressure of the water supply is low, the amount of water flowing out of the guide holes is bare, and then it is hard to achieve the balance weight to the keg float, therefore different water pressure can cause the inconformity of stopping heights of the keg float, and the final water level is unstable.

SUMMARY OF THE INVENTION

The object of the present invention is to offer an inlet structure of water-storing keg float which aims at that the balance weight of the keg float cannot be achieved when water pressure is low, and the technical proposal in the present invention is:

An inlet structure of water-storing keg float, comprises an inlet, an outlet pipe and a water-storing keg float with a storage tank, water from the inlet flows through a outlet pipe channel which is provided with a water-storing cavity and a guide hole, and water is guided from the water-storing cavity to the water-storing keg float by the guide hole.

Water is guided to flow out of the outside wall of the outlet pipe by the guide hole, and then enters the storage tank of the water-storing keg float below.

In a preferred embodiment, the following improvements can be done:

The end of the guide hole is provided with a guide plate which is vertically mounted and the end of which is hang in the air independently and located above the opening of the storage tank of the water-storing keg float.

The water-storing cavity is a circular tank; the guide hole is arranged at the lowest point of the top end of the water-storing cavity; the inlet is vertical to the outlet pipe, and is mounted at the eccentric position of the outlet pipe.

The water-storing cavity is located at the joint of the upper and the lower components of the outlet pipe, and the guide plate is at the outlet of the guide hole.

The storage tank of the keg float is provided with outlet hole. The inner wall of the outlet pipe is provided with a closing up footstep below the water-storing cavity.

The benefits of the present invention are:

Because the water-storing cavity is present, part of water from the inlet is stored in the water-storing cavity because of gravity, enough water always can be guaranteed to flow out of the outer wall of the outlet pipe through the guide hole, and then enters the storage tank of the water-storing keg float below; and then water is guided by the guide plate at the same time, so that this part of water can be fully guided into the storage tank at low water pressure states, and the keg float can be balanced effectively, and the stability is enhanced.

The water-storing cavity is located at the joint of the upper and the lower components of the outlet pipe, and is close to the inlet, and the root of the guide plate is not lower than the height of the water-storing cavity, so that the route of the falling of water from the inlet to the water-storing keg float is the shortest, and the timely balance weight to the keg float is guaranteed.

The outlet hole on the storage tank can drain out the stored water within a time, so that the buoyant force of the keg float can recover in time.

BRIEF DESCRIPTION OF THE DRAWINGS

With the following description of the drawings and specific embodiments, the invention shall be further described in details.

DESCRIPTION OF THE PREFERRED EMBODIMENTS

Figure 1:
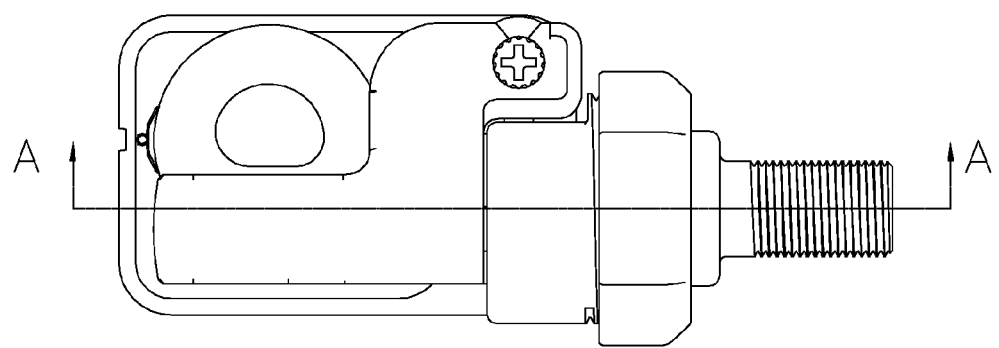
FIG. 1 shows the top view of one valve embodiment using the present invention.
Figure 2:
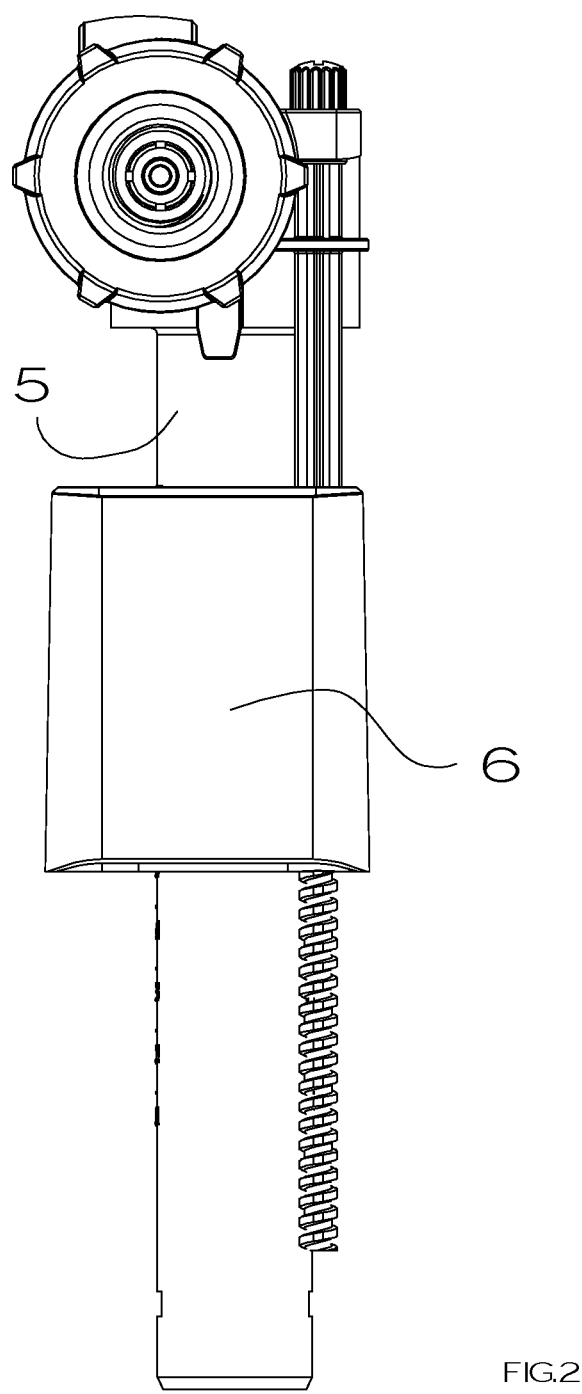
FIG. 2 shows the left view of the valve in FIG. 1.
Figure 3:
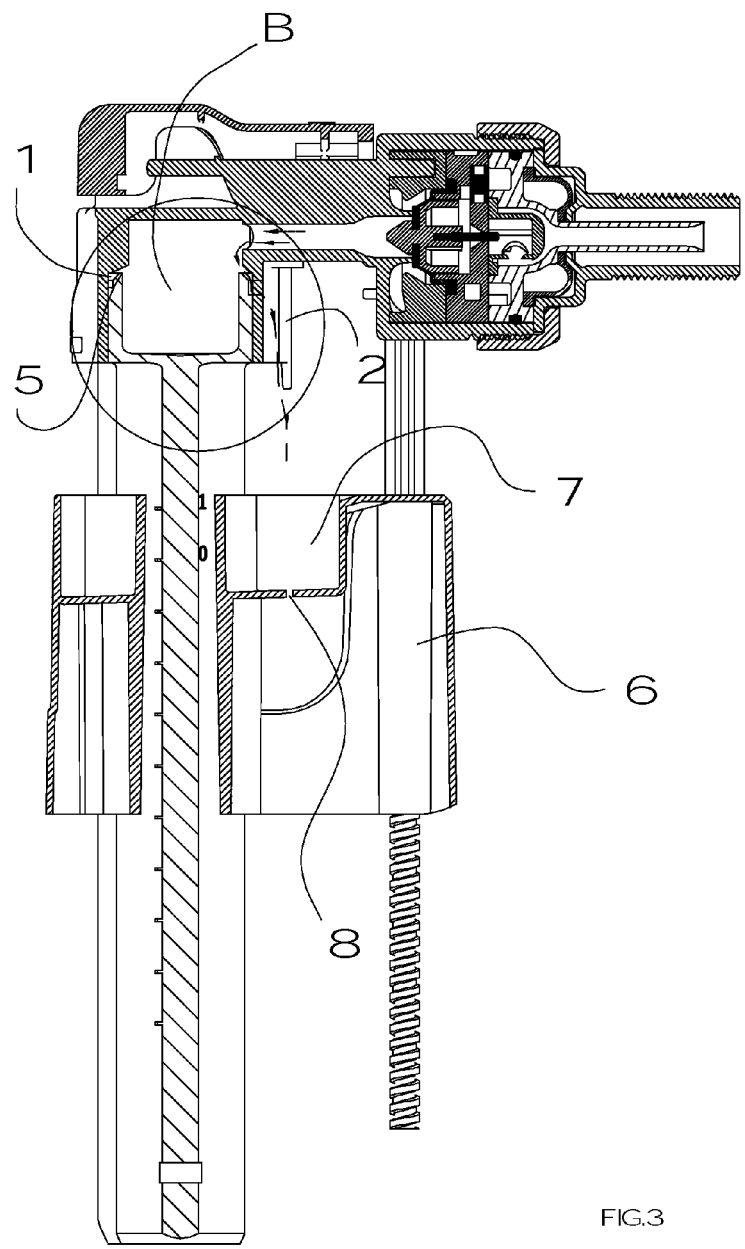
FIG. 3 shows the sectional view of the valve in FIG. 1 along A-A.

According to FIGS. 1 and 2, a valve using the present embodiment is present with a top view and a left view respectively; FIG. 3 shows the sectional view of the valve in FIG. 1 along A-A. As shown in FIG. 1, 2 and 3, 1 is water-storing cavity, 2 is guide plate, 5 is outlet pipe, 6 is water-storing keg float, 7 is storage tank, wherein the guide plate 2 is at vertical direction of the water channel 7, and the water flow direction are shown by the arrow.

Figure 4:
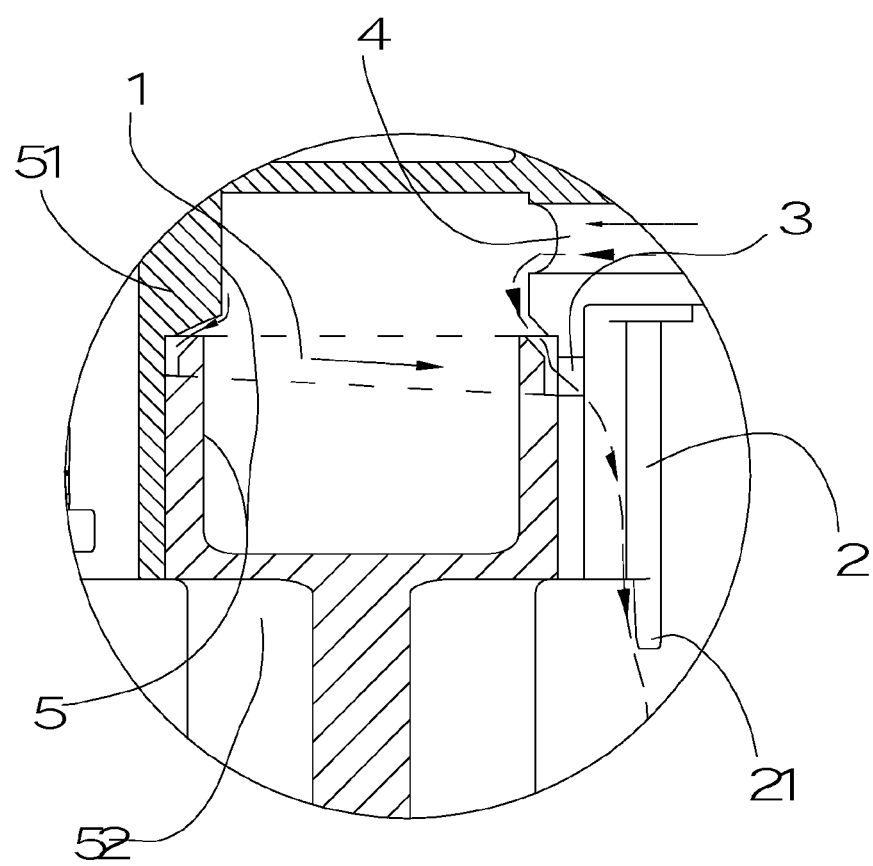
FIG. 4 shows the amplified detail view of FIG. 3B.

FIG. 4 shows the amplified view of FIG. 3B which shows the positional relationship of every component in details. 1 is circular water-storing cavity, 2 is guide plate, 3 is guide hole, 4 is inlet, 5 is outlet pipe, 51 is the upper component of the outlet pipe, 52 is the lower component of the outlet pipe, 21 is embossment of the end of the guide plate 2 that is hang in the air independently and facing the storage tank 7 of the keg float 6.

The water-storing cavity 1 is composed of the top end surface of the lower component 52 of the outlet pipe and the inner wall surface of the upper component 51 of the outlet pipe. The top surface of the circular body of the circular water-storing cavity 1 is at oblique states as shown from dotted line, of which the lowest end is at the position of the guide hole; the water-storing cavity 1, the guide hole 3 and the guide plate 2 are all adjoined the inlet 4.

The water flow direction is shown by the arrows in FIG. 4, because the water-storing cavity 1 is at the only route of the falling water flow which must be passed as shown in figure, the water flow from the inlet 4 can flush out at eccentric position with respect to the outlet pipe 5 and flow down along the pipe wall and will basically pass through the water-storing cavity 1, because the top circular surface of the water-storing cavity 1 is at oblique states, the water stored in the cavity will overflow and be guided to the guide hole 3, and then flow along the guide plate 2, and the drops into the storage tank 7 from the embossment of the end of the guide plate 2; as shown by the arrow in figure, because the circular water-storing cavity is provided with enough active area when the water pressure is low, the water flow can be effectively collected from the inlet 4 and the top pipe wall of the vertical outlet pipe 5, and then the balance weight to the keg float is furtherest guaranteed.

On the other hand, the water-storing cavity 1 is at the joint of the upper and the lower components of the outlet pipe 5, the root of the guide plate 2 is not lower than the level of the water-storing cavity 1, and is close to the guide plate 2, and the guide hole 3 is at the lowest states, and then the route of water flow from the water-storing cavity 1 to the end of the guide plate 2 is the shortest, and the timely balance weight to the keg float is guaranteed.

As shown in FIG. 3, the bottom of the storage tank 7 of the water-storing keg float is provided with small hole 8, so that the water for balance weight in the storage tank 7 will not stay long, and then the buoyant force of the keg float can recover in time.

The invention has been described with reference to the preferred embodiments mentioned above; therefore it cannot it the reference implementation of the invention. It is obvious to a person skilled in the art, that structural modification and changes can be carried out without leaving the scope of the claims hereinafter and the description above.

Industrial Applicability

A water-storing cavity is arranged on the inlet channel in the present invention, so that part of water from the inlet is stored in the water-storing cavity because of gravity, enough water always can flow into the storage tank of the below water-storing keg float though the guide holes, and the keg float can be balanced effectively, and the stability is enhanced.

What is claimed is:

1. An inlet structure of water-storing keg float, comprises an inlet, an outlet pipe and a water-storing keg float with a storage tank, wherein, water from the inlet flows through a outlet pipe channel which is provided with a water-storing cavity and a guide hole, and water is guided from the water-storing cavity to the water-storing keg float by the guide hole.

2. An inlet structure of water-storing keg float according to claim 1, wherein, water is guided to flow out of the outside wall of the outlet pipe by the guide hole, and then enters the storage tank of the water-storing keg float below.

3. An inlet structure of water-storing keg float according to claim 1, wherein, the end of the guide hole is provided with a guide plate which is vertically mounted and the end of which is hang in the air independently and located above the opening of the storage tank of the water-storing keg float.

4. An inlet structure of water-storing keg float according to claim 1, wherein, the water-storing cavity is a circular tank.

5. An inlet structure of water-storing keg float according to claim 4, wherein, the guide hole is arranged at the lowest point of the top end of the water-storing cavity.

6. An inlet structure of water-storing keg float according to claim 2, wherein, the inlet is vertical to the outlet pipe, and is mounted at the eccentric position of the outlet pipe.

7. An inlet structure of water-storing keg float according to claim 3, wherein, the water-storing cavity is located at the joint of the upper and the lower components of the outlet pipe, and the guide plate is at the outlet of the guide hole.

8. An inlet structure of water-storing keg float according to claim 1, wherein, the storage tank of the keg float is provided with outlet hole.

9. An inlet structure of water-storing keg float according to claim 2, wherein, the inner wall of the outlet pipe is provided with a closing up footstep below the water-storing cavity.

10. An inlet structure of water-storing keg float according to claim 2, wherein, the end of the guide hole is provided with a guide plate which is vertically mounted and the end of which is hang in the air independently and located above the opening of the storage tank of the water-storing keg float.

11. An inlet structure of water-storing keg float according to claim 2, wherein, the water-storing cavity is a circular tank.

12. An inlet structure of water-storing keg float according to claim 11, wherein, the guide hole is arranged at the lowest point of the top end of the water-storing cavity.

13. An inlet structure of water-storing keg float according to claim 10, wherein, the water-storing cavity is located at the joint of the upper and the lower components of the outlet pipe, and the guide plate is at the outlet of the guide hole.

* * * * *